Aug. 10, 1943.            L. J. HUMBERT            2,326,359
                         DISPENSING DEVICE
                       Filed Jan. 18, 1941          3 Sheets-Sheet 1
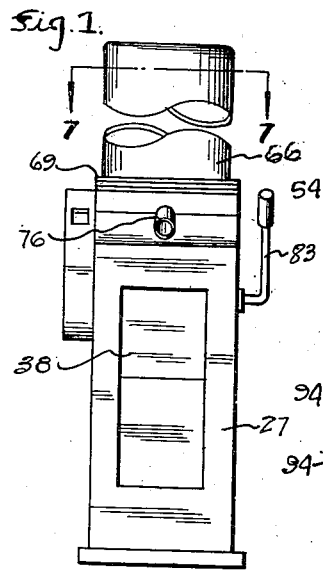
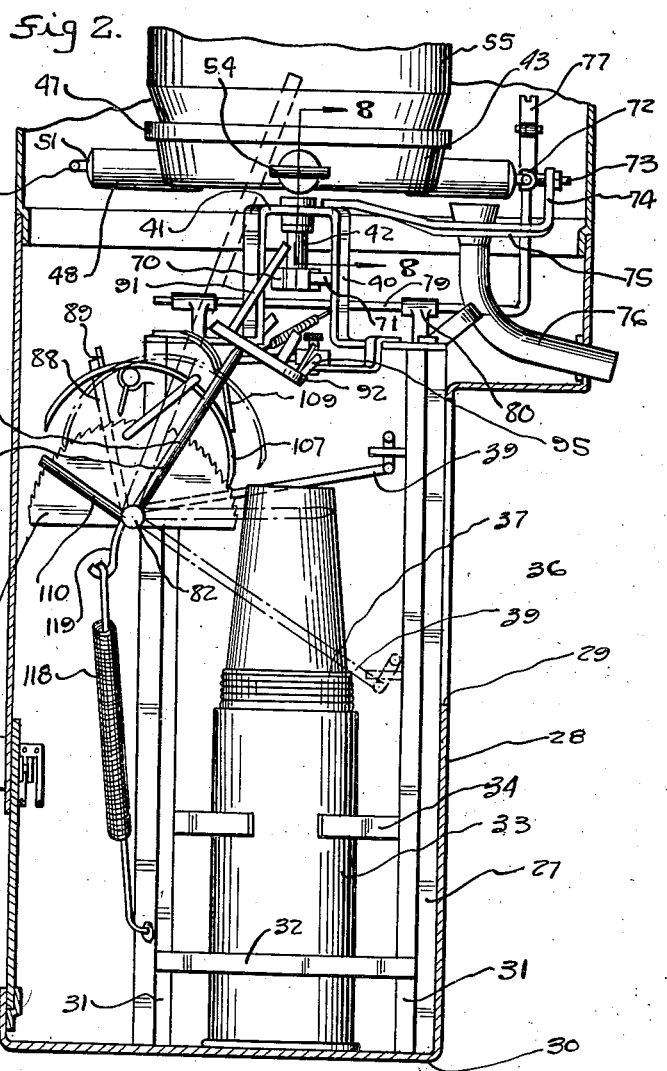
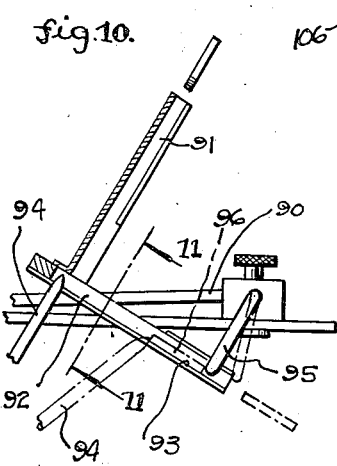
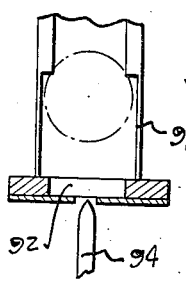
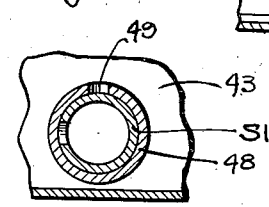
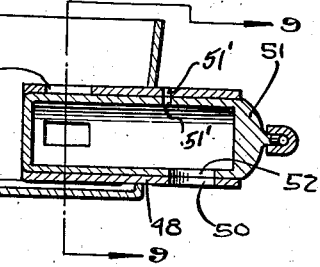
INVENTOR.
LOUIS J. HUMBERT.
BY
ATTORNEY.

Aug. 10, 1943.  L. J. HUMBERT  2,326,359
DISPENSING DEVICE
Filed Jan. 18, 1941  3 Sheets-Sheet 2
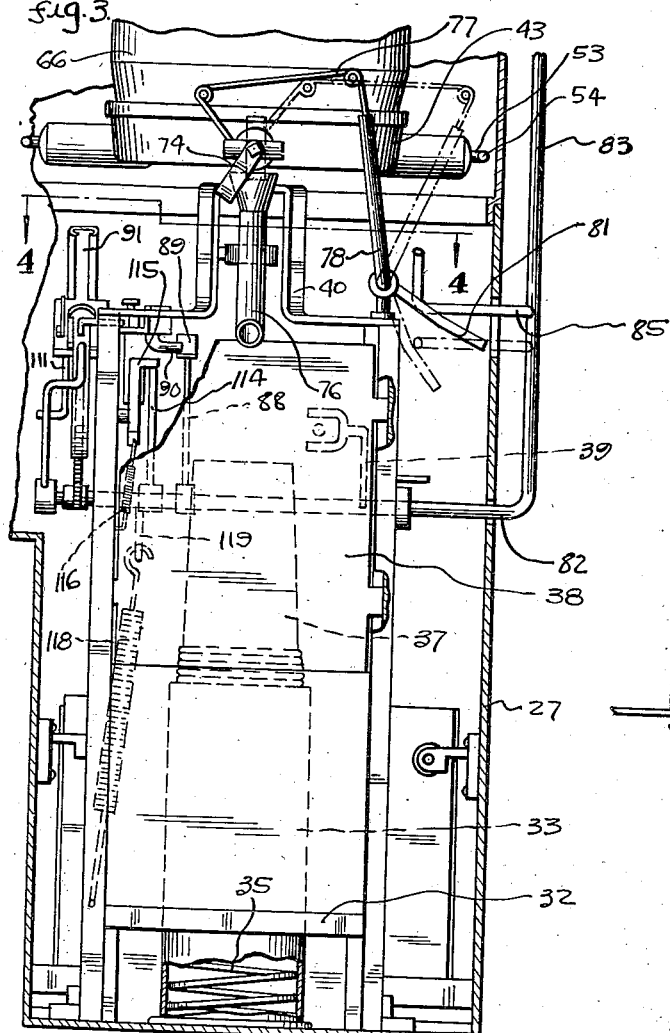
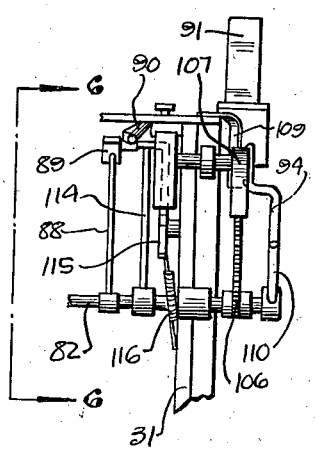
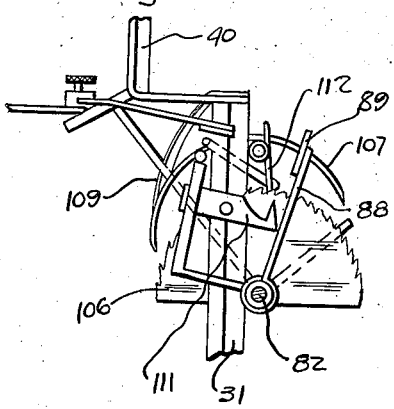
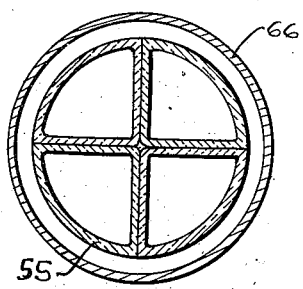
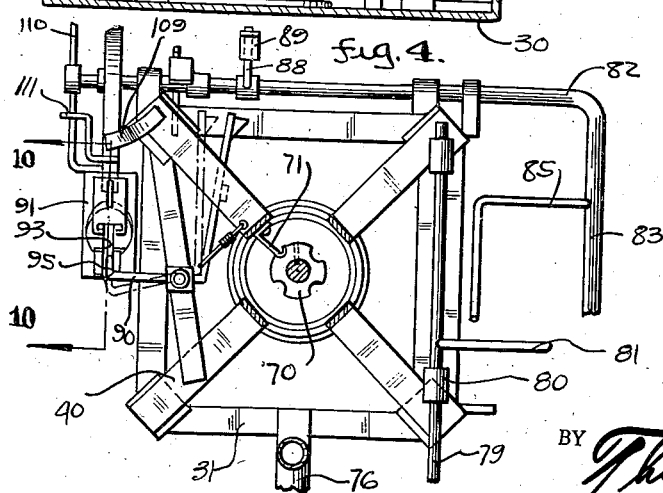
INVENTOR.
LOUIS J. HUMBERT
BY Thos. J. Donnelly
ATTORNEY.

Aug. 10, 1943.  L. J. HUMBERT  2,326,359
DISPENSING DEVICE
Filed Jan. 18, 1941  3 Sheets-Sheet 3
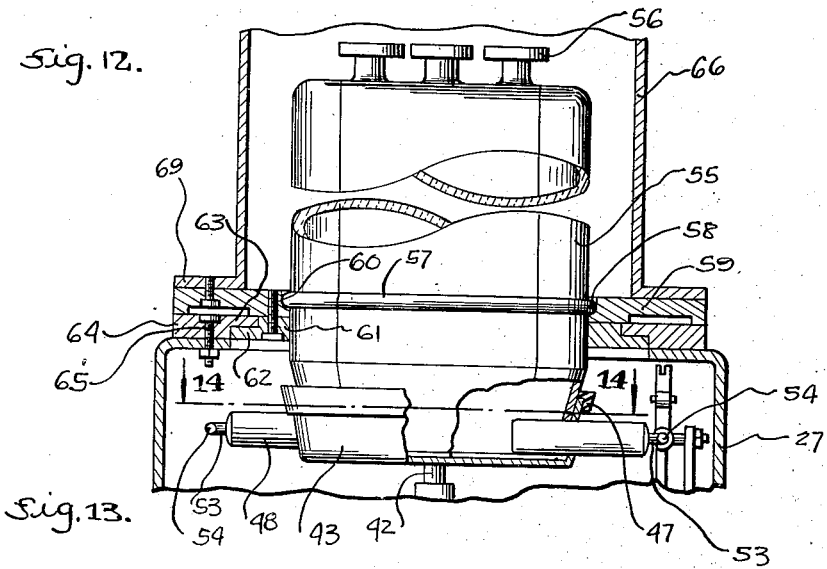
Fig. 12.
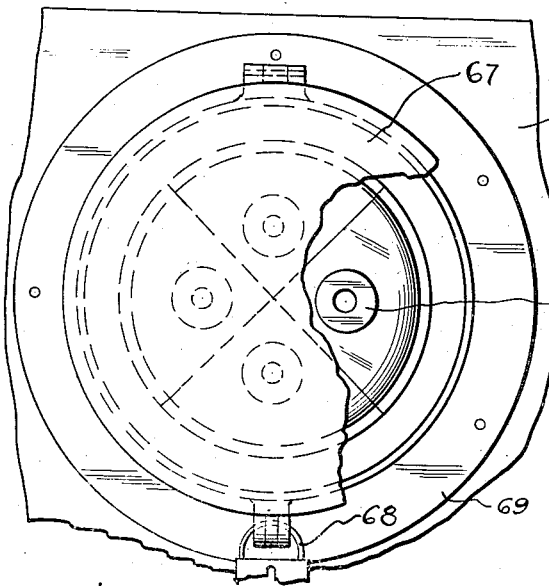
Fig. 13.
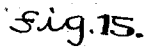
Fig. 15.
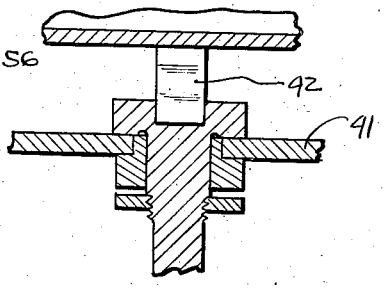
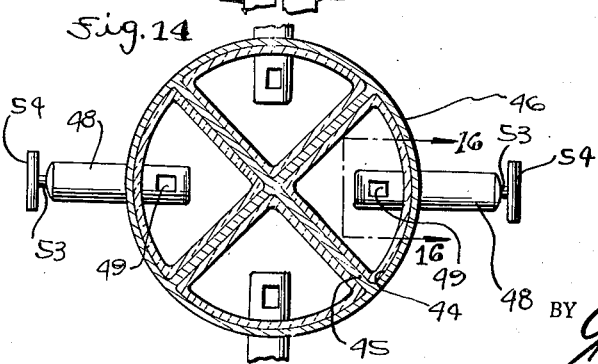
Fig. 14.
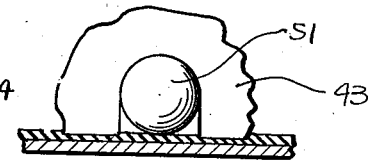
Fig. 16.
INVENTOR.
LOUIS J. HUMBERT.
BY Thos. L. Donnelly
ATTORNEY.

Patented Aug. 10, 1943

2,326,359

UNITED STATES PATENT OFFICE 2,326,359

DISPENSING DEVICE

Louis J. Humbert, Rhodelia, Ky.

Application January 18, 1941, Serial No. 375,008

2 Claims. (Cl. 225—21)

My invention relates to a new and useful improvement in a dispensing machine adapted for dispensing liquids. The machine is preferably of the coin-operated type, although from the description given it will be obvious that the coin control mechanism may be dispensed with if desired.

It is an object of the present invention to provide a dispensing device by which a number of liquids may be individually dispensed. It is another object of the present invention to provide a container having a plurality of compartments or separate vessels arranged thereon, together with a mechanism so constructed and arranged that the operator may, by manipulating the mechanism, discharge from such container, as may be selected, a predetermined amount of liquid.

Another object of the invention is the provision in a machine of this class, of a mechanism whereby a rotatable compartment-bearing container may be utilized for dispensing liquids of different kinds individually and whereby a rotation of the container during the dispensing operation may be prevented.

Another object of the invention is the provision, in a machine of this type, of mechanism whereby the operator, upon operating the machine, will serve to open a valve and permit a predetermined amount of liquid to be dispensed and when returning the mechanism to its normal position, will return the valve container to liquid receiving position to receive a definite amount of liquid.

Another object of the invention is the provision, in a mechanism of this type, of a construction whereby an operating lever may be utilized for operating the mechanism and provided with a reversable latch mechanism for controlling its operation in either direction.

Another object of the invention is the provision of mechanism of this class which will be simple of structure, economical of manufacture, durable, compact and highly efficient in use.

It is recognized that various changes and modifications may be made in the invention without departing from the spirit hereof and it is intended that such changes and modifications shall be embraced within the scope of the claims forming a part hereof.

Forming a part of this invention are drawings in which:

Fig. 1 is a front elevational view of the invention with a part broken away.

Fig. 2 is a slightly enlarged side elevational view with parts broken away and parts shown in section.

Fig. 3 is a slightly enlarged front elevational view with parts broken away and parts shown in section.

Fig. 4 is a sectional view taken on line 4—4 of Fig. 3.

Fig. 5 is a fragmentary, sectional view taken on line 5—5 of Fig. 3.

Fig. 6 is rear elevational view of Fig. 5, taken on line 6—6 of Fig. 5.

Fig. 7 is a transverse, sectional view through the liquid container taken on line 7—7 of Fig. 1 slightly enlarged.

Fig. 8 is a fragmentary sectional view taken on line 8—8 of Fig. 2.

Fig. 9 is a sectional view taken on line 9—9 of Fig. 8.

Fig. 10 is a fragmentary view taken on line 10—10 of Fig. 4.

Fig. 11 is a view taken on line 11—11 of Fig. 10.

Fig. 12 is a side elevational view of the container with parts broken away and parts shown in section.

Fig. 13 is a top plan view of Fig. 12 with parts broken away and parts shown in section.

Fig. 14 is a view taken on line 14—14 of Fig. 12.

Fig. 15 is an enlarged fragmentary, sectional view illustrating the receptacle.

Fig. 16 is a view taken on line 16—16 of Fig. 14.

The invention is intended as a liquid dispenser and lends itself particularly as a dispenser for mouth washes, to be installed in public places. On the American market a number of popular mouth washes are available to the public and experience has shown that a dispenser of this type is quite desirable, particularly in public places such as lavatories, trains, steamships, etc., and it is a purpose of the present invention to fill this want.

In the embodiment of the invention illustrated I utilize a housing 27 having a front wall 28 provided with an opening 29. Positioned in the housing and projecting upwardly from the base 30 thereof are spaced apart standards 31 connected together by the cross bars 32. Mounted on the base 30 is a cup receptacle 33 secured to the standards 31 by the brackets 34. Positioned in the housing 33 is a follower 34 normally pressed upwardly by the spring 35 against the stack of cups 36 which are mounted therein. Fastened on the upper end of the housing 33 is the spring retainer clips 36. The construction is such that the follower 34 presses the cups upwardly, the cups being positioned in the housing 33 in inverted position. The clips 36 serve to engage the bead 37 of the cup so that the propulsion of the cups out of the housing 33 by the spring is prevented and the removal of the cups singularly is made possible. A slide 38 is provided as a closure for the opening 29, this slide moving downwardly to uncover the opening 29. The slide is moved upwardly and downwardly by means of the rockable arm 39.

The upper ends of the standards 31 are turned inwardly to provide a supporting cage 40, on the top 41 of which is mounted a rotatable supporting shaft 42 which serves as a support for the cup-shaped retainer 43. This cup-shaped retainer is divided into a plurality of compartments 44 by means of the partitions 45, as clearly appears in Fig. 14. Extended around the inner surface of the wall 46 of the cup-shaped retainer and around the inner surface of the partitions 45 is a layer 47 of flexible material such as rubber or the like to provide a grip so that a tight connection may be made.

Projecting into each of the compartments 44 is a valve housing 48 which has an opening 49 on its inner end positioned diametrically opposite to an opening 50 on its outer end. Rotatably mounted in this valve housing 48 is a tubular valve plug 51 having an opening on its inner end adapted to register with the opening 49 and provided on its outer end, with an opening 52 and formed on the same side of the valve plug so that when the opening 51 registers with the opening 49, the opening 52 will not be in registration with the opening 50 and when opening 50 is in registration with opening 52, opening 49 will be closed by the valve plug.

Projecting outwardly from the valve plug is a stem 53 carrying a cross head 54 to serve as a means for rotating the valve plug, and bleed openings 51' are provided.

Positioned in inverted relation in each of the compartments 44 is a container 55 adapted for containing liquid such as mouth wash or the like. Each of these containers 55 is provided, on its top, with a lead valve 56. The construction is such that when the containers 55 are placed in position a unitary structure is provided and an opening of either of the valves will serve to lead off from the particular container to which it is attached, a predetermined quantity of liquid.

The engagement of the containers 55 in the cup-shaped member 43 is such that when the cup-shaped member 43 is rotated the containers also rotate so that a rotation of the containers will effect a rotation of the valve carried by the cup-shaped retainer.

Extended outwardly from the periphery of each of the containers 55 is a bead 57, the bead on adjacent containers registering so that an uninterrupted bead is provided. This bead is engaged in a channel 58 formed in the plate 59, this plate preferably being formed with rubber or the like. Clamped to the plate 59 by means of the screws 60 is a plate 61 so that the containers and the plates 59 and 61 are non-rotatably connected together. The plate 61 is provided with a reduced portion 62 which serves to overlie the flange 63 of the ring 64, this ring being secured by the bolt 65 to the housing 27.

Covering the containers 55 is a transparent housing 66 having a swingable cover 67 mounted thereon and secured by the lock 68 in closing position. This housing 66 is provided with the outwardly projecting flange 69 at its open end which is secured to the plate 59 so that the housing 66 rotates in unison with the plates 59 and the containers 55. The construction is such that the containers may be rotated to any desired position carrying with them the valve carried cup-shaped retainer 43. This rotation is effected by rotating the housing 66. The construction is also such that removal of the containers or housing from the casing or table 27 cannot be effected.

Mounted fixedly on the shaft 42 is an index wheel 70 adapted to engage a spring arm 71 projecting inwardly from the cage 40. The construction is such that as the container and cup-shaped retainer 43 are rotated the index wheel movable with the spring arm 71 which snaps into recesses formed in the index wheel 70, will serve to releasably secure the retainer 43 in predetermined positions of rotation.

As the retainer 43 is rotated and moves into a predetermined position of rotation the cross head 54 on the valve approaching the position will engage in the rotatable channel shaped actuating member 72 which is rotatably mounted on a shaft 73 journalled in the up-turned arm 74 of the bracket 75. This bracket also serves to support the outlet pipe 76 which projects externally of the housing 27. The shaft 73 is rotated by means of an operating mechanism embodying an arm 77 connected to the rockable lever 78 which extends forwardly from the rod 79, this rod 79 being journalled in the bearing 80 mounted on one of the standards 31. Mounted fixedly on and depending from the rod 79 is an arm 81. Rotatably mounted on the standards is a rod 82 having an upwardly extending lever or operating arm 83 carrying the inwardly projecting rods 84 and 85. These rods 84 and 85 are so arranged to the arm 81 that upon downwardly rocking of the lever 83 the arm 81 will be rocked downwardly into engagement with the rod 85, thus moving the valve to open position, that is rotating the valve plug so that the opening 50 will register with the opening 49 and permit a predetermined quantity of liquid to enter the valve plug. Upon upward rocking of the lever 83 the rod 84 will rock the arm 81 upwardly so as to again rotate the valve 180 degrees bringing the opening 52 into registration with opening 51 and permitting liquid contained within the valve to press outwardly through the tube 76, at the same time closing the opening in the inner end of the valve. Thus, upon downward and upward rocking of the lever 83 the valve will be alternately opened and closed permitting the quantity of liquid to flow into the valve plug and permitting it to be dispensed. When the arm 83 is rocked upwardly the channel member 72 will be returned to horizontal position so that the cup-shaped retainer 43 may be rotated to another predetermined position. In operating the mechanism the operator would pull the rod 83 downwardly and retain it in this position until a cup 36 had been removed from the stack of cups. Upon rocking the arm 83 downwardly the arm 39 will also be rocked downwardly so as to move the slide 38 downwardly into uncovering position, thus uncovering opening 29 and permitting the operator to insert the hand through the opening 39 and remove the cup 36. Upon release of the handle 33 and movement of the same upwardly the slide will again move to closed position.

It is intended that the mechanism shall be coin operated so that there will be a releasing mechanism for releasing the valve parts illustrated for operation, although from the description presented, if desired, the structure may be mechanically operated, the releasing mechanism being manually moved to releasing position. However in the form illustrated the coin operated mechanism is set forth and will be described.

Fixedly mounted on the rod 82 is an arm 88 carrying at its upper end, the engagement plate 89 which is adapted to engage a swingable abutment 90. When in engagement with the abutment 90 the arm 88 will prevent a rotation of the rod 82 beyond a predetermined distance and thus an operation of the mechanism is guarded against. The arm 82 will swing slightly until the member 89 engages the member 90.

A coin chute 91 is provided in which a coin may be deposited, the coin passing through the chute 91 onto a coin support 92, this coin support having a slot 93 formed therein in which engages the end of the rod 94 which is fixedly mounted on an end projected upwardly from the rod 82. Upon the initial rocking of the arm 83 the member 94 will ride in the slot 93 and clear the angularly turned end 95 of the abutment 90. When a coin 96 is resting on the coin support 92 the end of the rod 94 will engage the coin and move it into engagement with the member 95, thereby rocking the abutment member 90 so as to release engagement member 89 and permit operation of the mechanism. It is believed obvious that, if desired, the member 90 may be dispensed with or may be moved into non-engaging position so that the device need not be coin operated.

Fixedly mounted on the rod 82 is a segment ratchet wheel 106 having ratchet teeth on its periphery engageable with the opposite ends of the rockable pawl 107 which is formed substantially semi-circular, the teeth on the opposite side of the segment 106 being faced in opposite directions. This mechanism is to prevent an upward rocking of the handle 83 after it has been moved downwardly to partially open the valve so that it embodies the partially open valve and allow the handle 83 to return to its normal position. Consequently, the operator, once having released it cannot unwittingly return it to operating position until the entire cycle has been passed through. As the handle 83 is moved downwardly so that the rod 82 is rocked, the member 106 will rock. When the mechanism is in neutral position, the segment 106 is rocked to the position shown in Fig. 2 and the end of the pawl 107 engages the teeth. As the handle is moved downwardly so that the rod 82 is rocked the pawl 107 will be held in engagement with the teeth by the spring 109. This will prevent a rocking upwardly of the handle 83 or a reverse rocking of the rod 82. As the lowermost position of the handle 83 is reached an arm 110 will strike a crank 111 and rock the pawl 107 upwardly so that its opposite end will engage the teeth on the segment 106. At the same time, this segment will be latched by means of the latch 111 and the tongue 112 in such a position so that the pawl 107 is retained in the reverse position to take in Fig. 2 against the compression of the spring 109. As the handle moves upwardly the pawl will ride over the teeth of the segment 106 until an arm 114 which is carried by the rod 82 engages the crank 115 attached to the latch tongue 111 and rocks it into disengaging position, this latch tongue being normally held by the spring 116 in operative position. This will permit the pawl 107 to again rock into the position shown in Fig. 2.

A spring 118 is attached at one end to a hook 119 fixedly mounted on the rod 82 and at its opposite end to one of the standards 31 so as to normally tend to rock the rod 82 into position for bringing the handle 83 upwardly into neutral position.

The operation of the mechanism is such that when the member 90 is rocked out of the path of the member 89 a downward swing of the member 83 will effect, through the arm 39, a downward movement of the slide 38. At the same time the valve will be opened permitting the valve plug to fill with liquid from the compartment selected and the segment 106 will rock downwardly at the right side thereof in Fig. 2, the right end of the pawl 107 riding over the teeth. When the lowermost position is reached, the pawl 107 will be rocked so that its opposite end will engage the segment 106 and this pawl will be latched in this position thus permitting return movement of the rod 82. When the height of the return movement is reached, the pawl will be unlatched and permitted its movement to the position shown in Fig. 2.

What I claim as new is:

1. In a liquid dispensing device of the class described: a stationary supporting member; a compartment-bearing member rotatably mounted on said stationary supporting member and having a plurality of liquid-receiving compartments formed therein; a rotatable valve mechanism associated with each of said compartments for controlling the flow of liquid therefrom; a valve-operating mechanism carried by said supporting member and positioned for engagement with said valves individually upon rotation of said compartment-bearing member to a predetermined position and adapted upon actuation for opening and closing the valve; a rockable arm for, upon rocking in one direction, actuating said valve operating mechanism to valve-opening position and, upon rocking in the opposite direction, for actuating said valve-operating mechanism to valve-closing position; manually operable means for rocking said rockable member; and a releasable latch mechanism for preventing reverse rocking of said rockable member after initial rocking of said rockable member in one direction until completion of the movement of said rockable member in said direction.

2. In a liquid dispensing device of the class described: a stationary supporting member; a compartment-bearing member rotatably mounted on said stationary supporting member and having a plurality of liquid-receiving compartments formed therein; a rotatable valve mechanism associated with each of said compartments for controlling the flow of liquid therefrom; a valve-operating mechanism carried by said supporting member and positioned for engagement with said valves individually upon rotation of said compartment-bearing member to a predetermined position and adapted upon actuation for opening and closing the valve; a rockable arm for, upon rocking in one direction, actuating said valve operating mechanism to valve-opening position and, upon rocking in the opposite direction, for actuating said valve-operating mechanism to valve-closing position; manually operable means for rocking said rockable member; and a releasable latch mechanism for preventing reverse rocking of said rockable member after initial rocking of said rockable member in one direction until completion of the movement of said rockable member in said direction; and means for automatically tripping said latch mechanism to reverse position of operation upon completion of the rocking movement of said rockable member in either direction.

LOUIS J. HUMBERT.